(12) United States Patent
Ikeda

(10) Patent No.: US 7,130,940 B2
(45) Date of Patent: Oct. 31, 2006

(54) INTERFACE APPARATUS AND IMAGE FORMING APPARATUS

(75) Inventor: Muneaki Ikeda, Sunto-gun (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 295 days.

(21) Appl. No.: 10/791,754

(22) Filed: Mar. 4, 2004

(65) Prior Publication Data

US 2005/0198428 A1  Sep. 8, 2005

(51) Int. Cl.
*G06F 13/12* (2006.01)
(52) U.S. Cl. .......................................... 710/72; 713/324
(58) Field of Classification Search ................. 710/72; 713/324
See application file for complete search history.

(56) References Cited

U.S. PATENT DOCUMENTS

| 4,991,972 | A | * | 2/1991 | Ikenoue et al. ............. 358/1.14 |
| 5,504,929 | A | * | 4/1996 | Blair et al. .................... 710/65 |
| 5,528,346 | A | * | 6/1996 | Kim et al. ..................... 399/33 |
| 5,752,049 | A | * | 5/1998 | Lee ............................. 713/323 |
| 5,803,623 | A | * | 9/1998 | Iwasaki ........................ 400/54 |
| 6,040,792 | A | * | 3/2000 | Watson et al. ............... 341/100 |
| 6,191,713 | B1 | * | 2/2001 | Ellis et al. ................... 341/100 |
| 6,450,605 | B1 | * | 9/2002 | Walmsley et al. ............. 347/12 |
| 6,883,047 | B1 | * | 4/2005 | Warren et al. ................. 710/67 |
| 6,937,353 | B1 | * | 8/2005 | Iizuka et al. ................ 358/1.13 |
| 2002/0186395 | A1 | * | 12/2002 | Katsu ......................... 358/1.13 |

FOREIGN PATENT DOCUMENTS

| EP | 759590 A1 | * | 2/1997 |
| JP | 2000353032 A | * | 12/2000 |
| JP | 2002-14913 A |   | 1/2002 |

OTHER PUBLICATIONS

PL-2305 USB to IEEE 1284 Bridge Controller Product Datasheet, Revision 1.1, Aug. 2002,Prolific Technology Inc.*

* cited by examiner

*Primary Examiner*—Paul R. Myers
(74) *Attorney, Agent, or Firm*—Foley & Lardner LLP

(57) ABSTRACT

An interface apparatus includes a USB interface portion which makes communication with an external first device via a USB cable, a parallel interface portion which makes communication with an external second device via a parallel cable, and a control portion which, after a processing command signal has been received from the first device via the USB interface, when a signal state of the parallel interface portion is detected, and then, it is determined that the second device connected to the parallel interface portion enters a power saving mode, generates a switch signal for switching the current power saving mode to a normal mode to supply the switch signal to the second device via the parallel interface portion, and after it has been detected that the second device has been switched into the normal mode, controls the processing command signal so as to be supplied to the second device via the parallel interface portion.

1 Claim, 5 Drawing Sheets

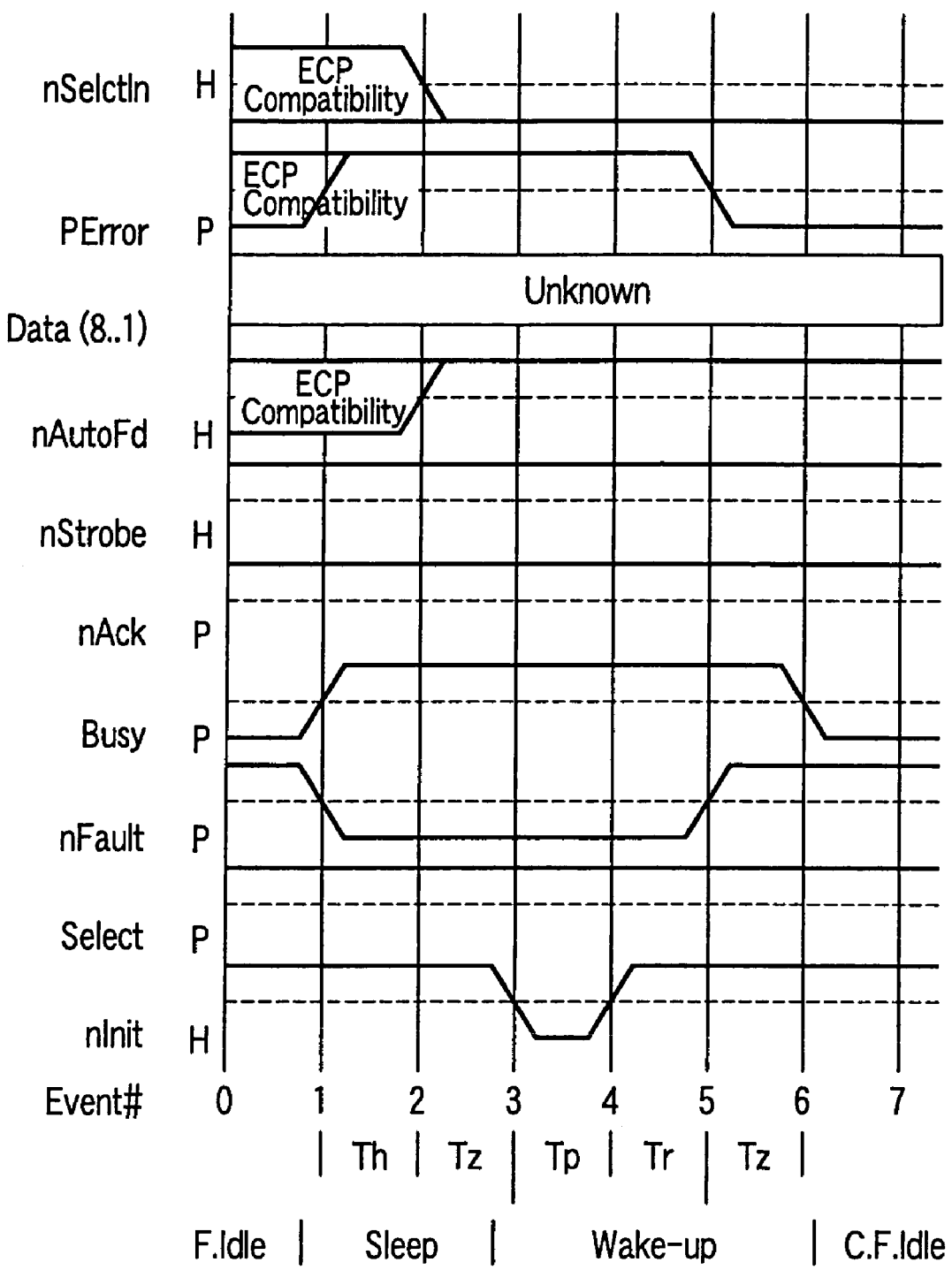
F I G. 4

INTERFACE APPARATUS AND IMAGE FORMING APPARATUS

BACKGROUND OF THE INVENTION

A Universal Serial Bus (USB) is known as one of interfaces between a host unit such as a personal computer and a device or unit such as a printer unit. Further, a parallel interface is known as one of interfaces which carry out data transmission between a host unit such as a personal computer and a device or unit such as a printer unit. Here, there is a case in which a parallel interface is used at the printer unit, and a USB interface is used at the host unit such as a personal computer, and an interface apparatus which interfaces these units is known.

For example, a prior art document (Jpn. Pat. Appln. KOKAI Publication No. 2002-14913) discloses an interface circuit which interfaces a USB interface and a parallel interface. In this publication, when GET_PORT_STATUS is received from a personal computer via the USB interface, a port status is transmitted to the personal computer in response to this receipt. In this manner, it becomes possible to send a predetermined processing command or the like to the printer side from the personal computer via the USB interface.

However, in this prior art, for example, in the case where the printer side enters a power saving mode, there is not disclosed how processing should be carried out from the personal computer side in order to enter a normal mode. Therefore, there is a problem that the personal computer side cannot cause the printer unit to carry out smooth printing processing reliably via the USB interface and parallel interface.

BRIEF SUMMARY OF THE INVENTION

According to one aspect of the present invention, there is provided an interface apparatus, comprising: a USB interface portion which makes communication with an external first device via a USB cable; a parallel interface portion which makes communication with an external second device via a parallel cable; and a control portion which, after a processing command signal has been received from the first device via the USB interface, when a signal state of the parallel interface portion is detected, and then, it is determined that the second device connected to the parallel interface portion enters a power saving mode, generates a switch signal for switching the current power saving mode to a normal mode to supply the switch signal to the second device via the parallel interface portion; and after it has been detected that the second device has been switched into the normal, controls the processing command signal so as to be supplied to the second device via the parallel interface portion.

BRIEF DESCRIPTION OF THE SEVERAL VIEWS OF THE DRAWING

FIG. 4 is a timing chart illustrating an example of a processing operation of the interface apparatus according to the invention.

DETAILED DESCRIPTION OF THE INVENTION

Figure 1:
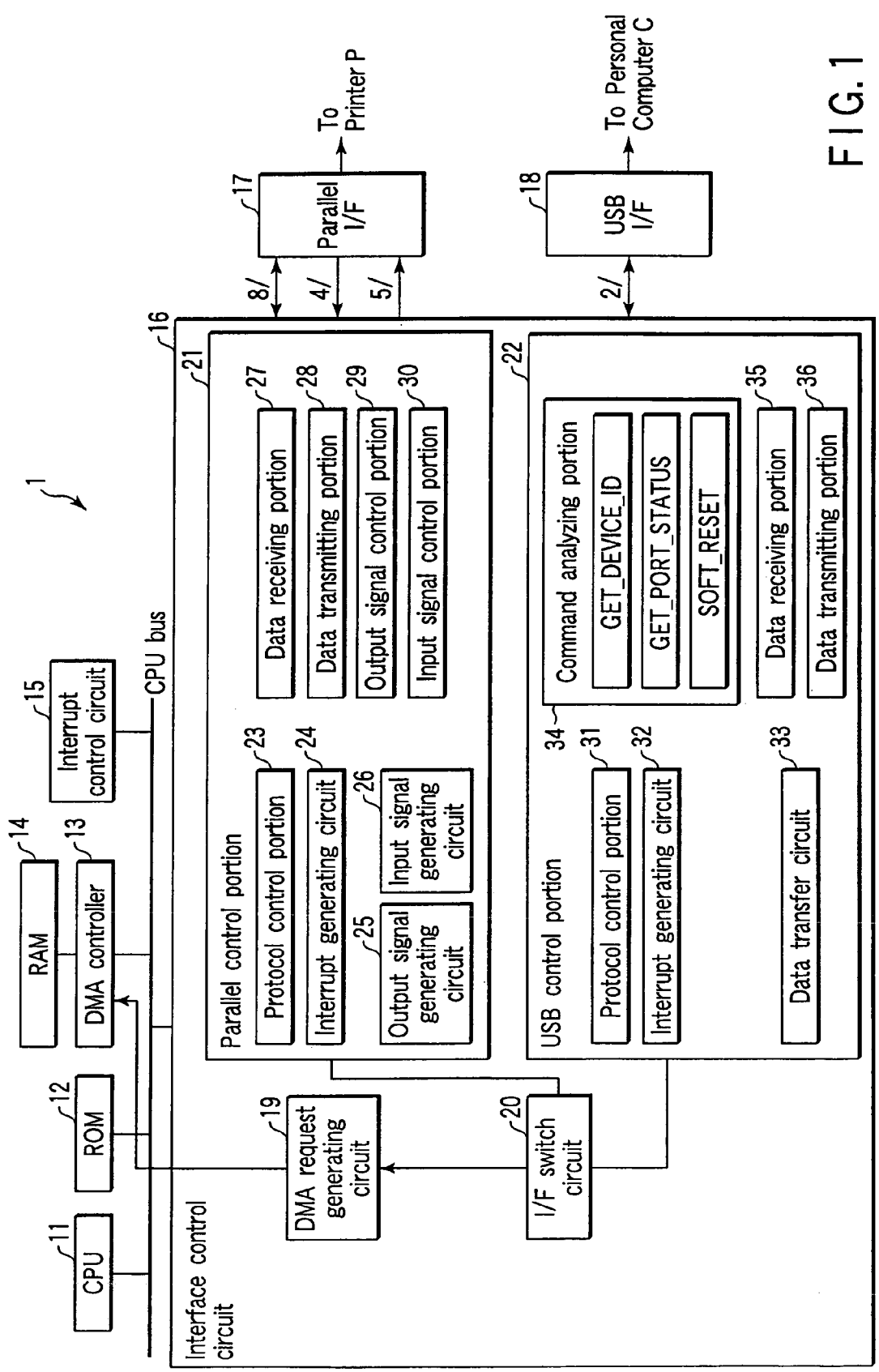
FIG. 1 is a block diagram depicting an example of a configuration of an interface apparatus according to the present invention.
Figure 2:
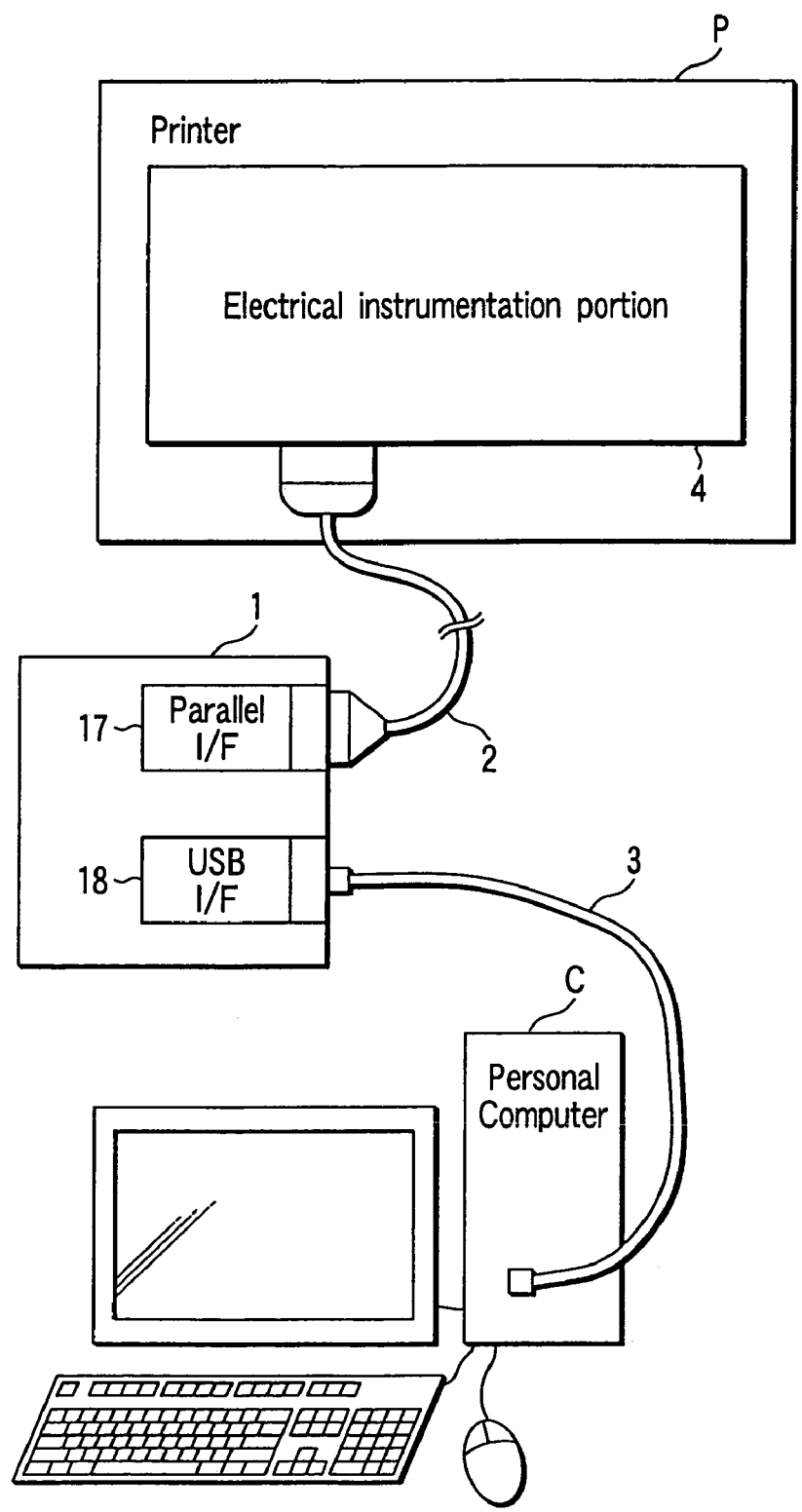
FIG. 2 is a connection diagram showing an example of connection among the interface apparatus according to the invention, a printer, and a personal computer (PC)
Figure 3:
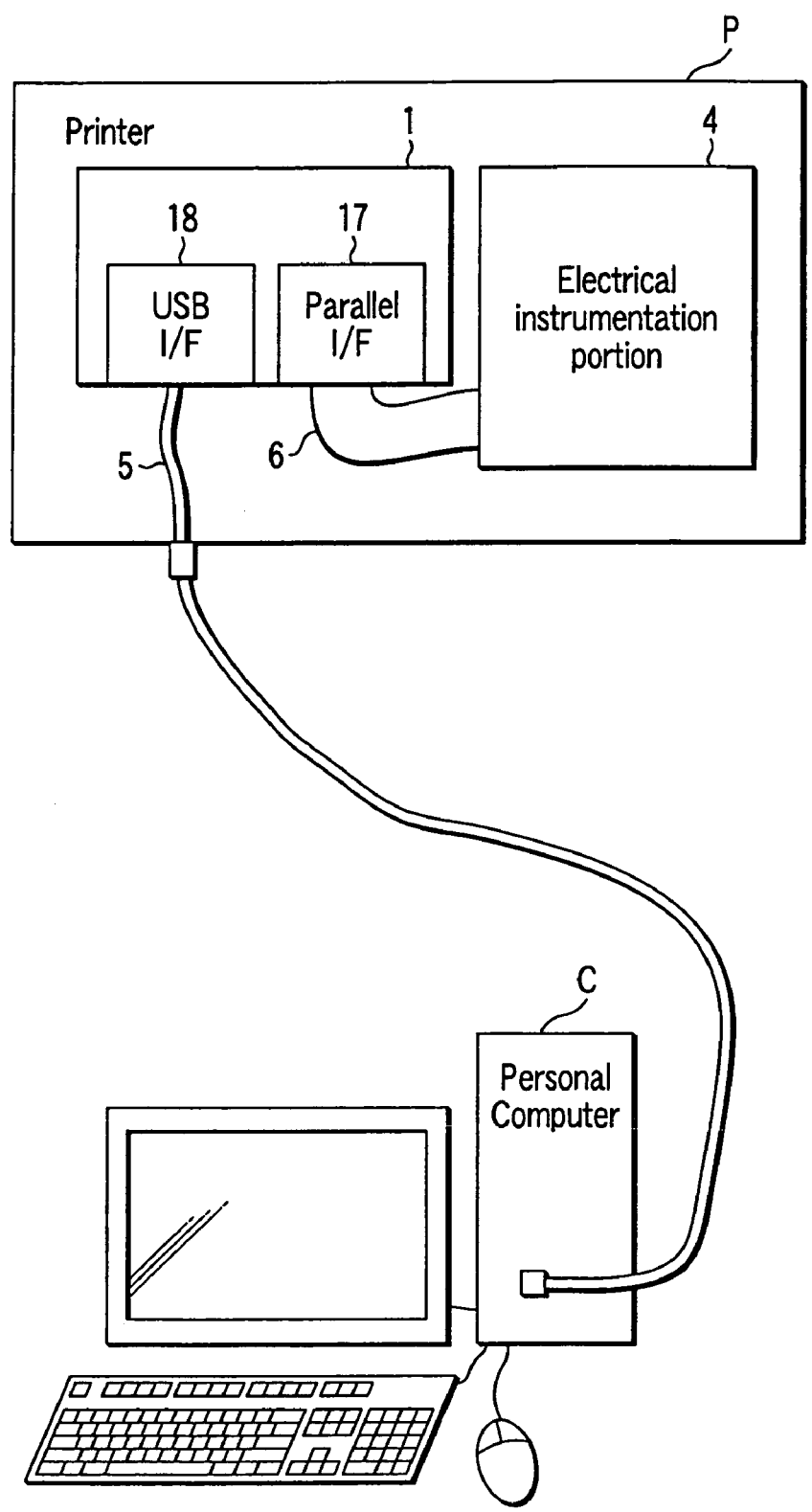
FIG. 3 is a connection diagram showing a case in which the interface apparatus according to the invention is incorporated into the printer, and is connected to the PC.
Figure 5:
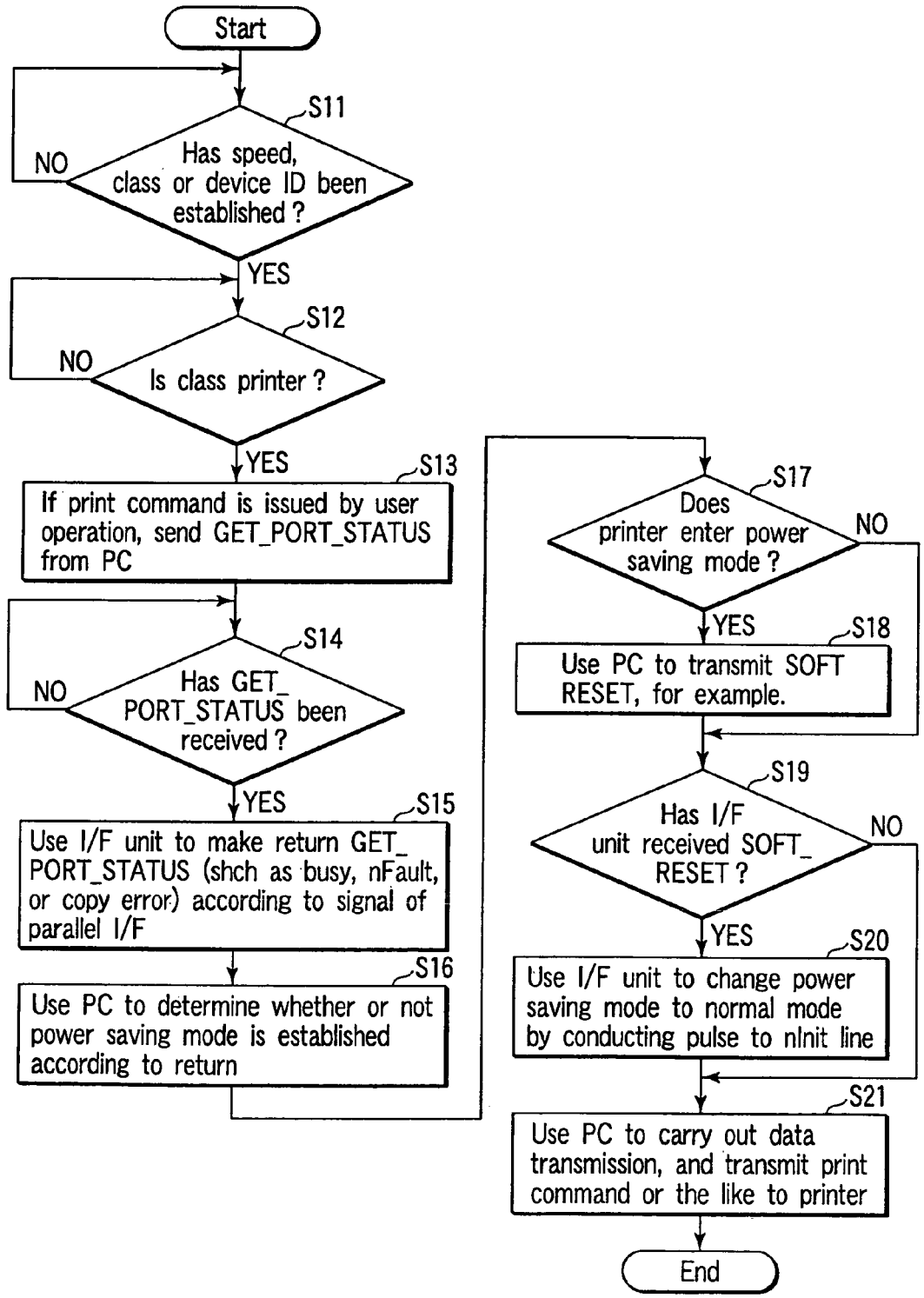
FIG. 5 is a flow chart illustrating an example of a processing operation of the interface apparatus according to the invention.

Hereinafter, an interface apparatus according to the present invention and an image forming apparatus using the same will be described with reference to the accompanying drawings. FIG. 1 is a block diagram depicting an example of a configuration of the interface apparatus according to the invention. FIG. 2 is a connection diagram showing an example of connection among the interface apparatus according to the invention, a printer, and a personal computer (PC). FIG. 3 is a connection diagram showing a case in which the interface apparatus according to the invention is incorporated into the printer, and is connected to the PC. FIG. 4 is a timing chart illustrating an example of a processing operation of the interface apparatus according to the invention. FIG. 5 is a flow chart illustrating an example of a processing operation of the interface apparatus according to the invention.

<Interface Apparatus According to the Present Invention>

(Configuration)

An interface apparatus 1 according to the invention, in FIG. 1, has two interfaces: a USB interface and a parallel interface which conforms to IEEE Std 1284, and has a function for conversion between these interfaces. Now, embodiments of the present invention will be specifically described here. The interface apparatus 1 according to the invention, in FIG. 1, comprises: a CPU 11 connected to the CPU bus and controlling an whole operation; a ROM 12 which storing a program to be executed by the CPU 11; an interface control circuit 16 which carries out interface control according to the invention; an interrupt control circuit 15 which generates an interrupt on the CPU 11; a RAM 14 used as a receiving buffer which stores data received from a parallel interface portion 17 and a USB interface portion 18; and a DMA controller 13 which carries out data transfer control for the RAM 14.

Further, the interface control circuit 16 of the interface apparatus 1 according to the invention comprises: a parallel control portion 21 which controls a parallel interface conforming to IEEE Std 1284; a USB control portion 22 which controls a USB interface conforming to a USB standard; an interface switch circuit 20 which switches these two interfaces; and a DMA request generating circuit 19 connected to this switch circuit and controlling a DMA for transferring received data to a receiving buffer.

Furthermore, the interface apparatus 1 according to the invention has the parallel interface portion 17 which is connected to the parallel control portion 21 of the interface control circuit 16; and the USB interface portion 18 which is connected to the USB control portion 22.

Still furthermore, the parallel control portion 21 included in the interface control circuit 16 of the interface apparatus 1 according to the invention comprises: a protocol control portion 23; an interrupt generating circuit 24 which controls interrupt processing; an output signal generating circuit 25; an input signal detecting circuit 26; a data receiving portion 27; a data transmitting portion 28; an output signal control portion 29; and an input signal control portion 30.

Similarly, the USB control portion 22 included in the interface control circuit 16 of the interface apparatus 1 according to the invention comprises: a protocol control portion 31; an interrupt generating circuit 32 which controls interrupt processing; a data transfer circuit 33; a data receiving portion 35; a data transmitting portion 36; and a command analyzing portion 34 which analyzes commands such as GET_DEVICE_ID, GET_PORT_STATUS, and SOFT_RESET.

Example 1 of Connection woth Peripheral Device

The above-described interface apparatus 1, as shown in FIG. 2, is connected to a printer unit P via a parallel cable 2 as an example. Further, this interface apparatus 1 is connected to a personal computer unit C which is a host computer via a USB cable 3.

Here, the printer unit P comprises at least an electrical instrumentation portion 4 including a printer engine portion, to which the parallel cable 2 is connected. Here, the electrical instrumentation portion 4 including the printer engine portion, although its configuration is not shown, comprises, as an example, a system control portion which controls an whole operation; a control panel connected to each device, the control panel supplying operation information upon a receipt of a user operation; an image reading portion such as a scanner; a recording medium such as an HDD (Hard Disk Drive) which stores inputted image information; an image processing portion which carries out a variety of image processing operations such as color conversion processing, color correction, or image reduction and expansion. Further, the electrical instrumentation portion comprises an image forming unit constituted of: a laser optical system which generates a laser beam according to given image information; and an image forming portion for forming an image on a drum being an image carrier upon a receipt of this laser beam, and depositing the image on paper.

In this way, by making connection via the interface apparatus 1 according to the invention, it becomes possible to connect the printer unit P capable of making only parallel connection and the personal computer C capable of making only USB connection. In addition, an operation of a print command or the like can be carried out.

Example 2 of Connection with Peripheral Device

Further, the interface apparatus 1 according to the invention described above, as shown in FIG. 3, is suitable to be connected as a mode included in the printer unit P. That is, the interface apparatus 1 incorporated in the printer device P is connected to the personal computer unit C via the USB cable 3 and a USB cable 5 included in the printer unit P. Further, the interface apparatus 1 provided inside of the printer unit P is connected to the electrical instrumentation portion 4 of the printer unit P via a parallel cable 6 at the inside of the printer unit P. The electrical instrumentation portion 4 is provided as an electrical instrumentation portion including a printer engine portion which comprises the above-described configuration as an example.

<Operation of Interface Apparatus According to the Present Invention>

The interface apparatus 1 according to the invention shows the above-described modes shown in FIGS. 1 to 3. Further, an example of a printing operation of the interface apparatus according to the invention will be described in detail with reference to a flow chart of FIG. 5.

The following printing operation is not shown as an operation in the interface apparatus 1 only, but is shown as a linkage operation of: (1) an operation of a printer driver in the personal computer C; (2) an operation inside the interface apparatus 1; and (3) an operation inside the printer unit P. These operations are further suitable to be carried out mainly as a printing operation using the interface apparatus, i.e., as a mode of (1) significantly reducing a ratio of the operation of the printer driver in the personal computer C; and (2) significantly increasing a ratio of the operation in the interface apparatus 1.

(Printing Operation Using Printer Driver)

First, the interface apparatus 1 according to the invention will be described with reference to FIG. 5 in a connection mode shown in FIG. 2, for example. In this interface apparatus, a speed, a class, a device ID or the like is established between the interface apparatus and the personal computer C (S11), and then, it is checked that the class is a printer (S12). Then, in the personal computer C, when it is determined that a print command is issued by a user operation, GET_PORT_STATUS is first transmitted to the interface apparatus 1 as an operation of the printer driver, instead of immediately supplying printing image information and print command to the USB interface portion 18 according to this user's print command (S13).

In the interface apparatus 1, when this GET_PORT_STATUS is received from the USB interface 18 via the USB cable 3 as an operation of an operating program of the ROM 12 (S14), the DMA controller 13 is started up from the interface control circuit 16, and then, data is temporarily stored in a receiving buffer region in the RAM 14 by means of DMA transfer. It is determined whether or not the data stored in the receiving buffer is a command GET_DEVICE_ID, GET_PORT_STATUS, or SOFT_RESET by the command analyzing portion 34 in the USB control portion 22. The other Bulk_IN is transferred to the parallel interface portion 17 as a Forward Transfer specified in IEEE Std 1284 by means of the protocol control portion 23, the output signal generating circuit 25, the data transmitting portion 28, and the output signal control portion 29 in the parallel control portion 21 at the same time when it is recorded in the RAM 14 by means of the DMA controller 13 which carries out data transfer control.

In contrast, in the case where input data is provided from another personal computer via the parallel interface portion 17 as well, the DMA controller 13 is started up from the interface control circuit 16 similarly. Then, data is temporarily stored in the receiving buffer region in the REAM 14 by means of DMA transfer. The data stored in the receiving buffer is transferred as Bulk_OUT to the USB interface portion 18 by means of the data transfer circuit 33 and data transmitting portion 36 in the USB control portion 22.

Here, the command analyzing portion 34 in the USB control portion 22, as shown in FIG. 1, comprises functions of a GET_DEVICE_ID register, a PORT_STATUS register, and a SOFT_RESET register in order to respond to each command request from the personal computer C which is a host unit. The PORT_STATUS register is provided as a register which latches and maintains information from each signal line of "Peripheral Driven" in the parallel interface. The input signal detecting circuit 26 in the parallel control portion 21 detects an edge of each of PError, nAck, Busy, nFault, and Select signals which are input signals of the parallel interface portion 17, and generates a write control signal of the PORT_STATUS register.

In the USB standard, a response of 1 Byte: 8 bits is defined as a response of GET_PORT_STATUS. Bits are assigned as follows: 0 to 2: Reserved, 3: Not Error (1=No Error, 0=Error), 4: Select (1=Selected, 0=Not Selected), 5: Paper Empty (1=Paper Empty, 0=Paper Not Empty), and 6 to 7: Reserved. On the other hand, for example, as shown in FIG. 4, expansion such as indicating a power saving mode by PError: High, nAck: High, Busy: High, nFault: Low, Select: High is applied to a parallel port. In response to this state, in the case where the power saving mode is restored to a normal mode by generating an nInit pulse from the personal computer C at the host side, 3 bits defined in the USB standard cannot detect all states.

Because of this, 8 bits indicating a status are assigned as follows, for example: 0: State of PError line, 1: State of nAck line, 2: State of Busy line, 3: Not Error (1=No Error, 0=Error), 4: Select (1=Selected, 0=Not Selected), 5: Paper Empty (1=Paper Empty, 0=Paper Not Empty), 6: State of nFault line, and 7: State of Select line. Then, a state concerning all signal lines of "Peripheral Driven" in a parallel port can be returned as a response of "GET_PORT_STATUS" by the personal computer C at the host side. In this way, the personal computer C at the host side can detects, for example, that the printer device P currently enters a power saving mode from a signal line state of the parallel port via the USB port (S15).

In response to this detection, when the personal computer C at the host side detects, for example, that the current printer unit P enters the power saving mode from the state of each of the signals PError, nAck, Busy, nFault, and Select which are responses of GET_PORT_STATUS (S17), restoration from wait information in the power saving mode to a standby state is requested to the interface apparatus 1 by means of the SOFT_RESET command, as an example. The command analyzing portion 34 in the USB control portion 22 of the interface apparatus 1 having detected the SOFT_RESET command generates an nInit pulse at the parallel interface portion 17 through the protocol control portion 23 and output signal generating circuit 25 in the parallel control portion 21 via the interrupt generating circuit 32. Then, the generated nInit pulse is supplied to the printer unit P via the parallel interface portion 17 (S20).

In contrast, when an operation mode of the printer unit P is switched from the power saving mode to the normal mode, during this switching, the personal computer C at the host side which cannot obtain a response to the SOFT_RESET command on the USB standard, causes an operation of the printer driver, to monitor the state of each of the signal lines PError, nAck, Busy, nFault, and Select which are input signals of the parallel interface portion 17, by means of the GET_PORT_STATUS command again, and to detect that the standby state according to the normal mode is restored (S20). The personal computer C, as a function of the printer driver, supplies a print command and printing image information to the interface apparatus 1 via the USB cable after checking that this normal mode is restored. The interface apparatus 1 having received this print command and printing image information converts the command and information via an interface conversion, and transmits them to the printer unit P via the parallel cable 2. The printer unit P carries out image forming on paper based on this print command and printing image information in the normal mode, and outputs the printed paper.

As has been described above, with the interface apparatus 1 according to the invention, in the personal computer C via the USB interface, for example, connected to this interface apparatus, a user merely makes an operation for providing a print command, whereby the current power saving mode is automatically switched into the normal mode by the operation of the printer driver of the personal computer C and the operation of the program of the interface apparatus 1, the print command and image information are transferred to the printer unit P, and operation is made so as to printing processing. In this manner, processing operations such as printing processing can be executed by easy operation even via a plurality of different interfaces such as a USB interface or a parallel interface.

(Printing Operation Mainly Using Interface Apparatus)

Now, a description will be given below in detail with respect to a case in which a printing operation carried out by using the printer driver of the personal computer C and the operating program of the interface apparatus, shown by referring to FIG. 5, is mainly carried out as an operation of the interface apparatus. By carrying out a printing operation mainly using the interface apparatus, the number of communications is reduced without imparting a burden to the printer driver of the personal computer C, thus making it possible to enhance operation stability. This main printing operation using the interface apparatus is specified by the following statement with reference to the processing operation shown in FIG. 5.

That is, in the interface apparatus 1 according to the invention, for example, in the connection mode shown in FIG. 2, a speed, a class, a device ID or the like is established between the interface apparatus and the personal computer C (S11), and it is checked that the class is a printer (S12). Then, in the personal computer C, when a print command is issued by the user operation, printing image information and the print command are supplied to the USB interface portion 18.

In the interface apparatus 1, the printing image information and print command are stored to a storage region such as the RAM 14 as an operation of the operating program of the ROM 12. In addition, the CPU 11 causes an operation of the operating program of the ROM 12, by using the input signal detecting circuit 26 in the parallel control portion 21, based on the received printing image information and print command, to detect an edge of each of the signals PError, nAck, Busy, and Select which are input signals of the parallel interface portion 17 and to determined whether or not the printer unit P currently enters the power saving mode.

Then, when it is determined that the printer unit enters the power saving mode, the protocol control portion 23 and output signal generating circuit 25 of the parallel control portion 21 are controlled and an nInit pulse is generated at the parallel interface portion 17, as an operation of the CPU 11 and the operating program in the ROM 12. The generated nInit pulse is supplied to the printer unit P via the parallel interface portion 17 (refer to S20).

In contrast, when the operating mode of the printer unit P is switched from the power saving mode to the normal mode, an operation of the CPU 11 and the operating program in the ROM 12 monitors the state of each of the signal lines PError, nAck, Busy, nFault, and Select which are input signals of the parallel interface portion 17, by means of the GET_PORT_STATUS command again, and detects that the standby state according to the normal mode is restored (refer to S20).

In contrast, the interface apparatus 1 causes an operation of the CPU 11 and the operating program of the ROM 12 to read out the print command and printing image information from the RAM 14, and then, transmits the command and information to the printer unit P via the parallel cable 2. The printer unit P carries out image forming on paper based on the print command and printing image information in the normal mode, and outputs the printed paper.

In this way, with the interface apparatus 1 according to the invention, the CPU 11 and the operating program of the ROM 12 are caused to execute a part of the functions of the printer diver of the personal computer C in FIG. 5 in a substitutive manner, whereby, restoration from the power saving mode to the normal mode and the subsequent print command can be carried out while processing operation has been significantly reduced. In this manner, a printing operation due to interface conversion with higher reliability can be carried out.

Furthermore, as shown in FIG. 3, similar operation and advantageous effect can be attained by incorporating the interface apparatus 1 into a mainframe of the printer unit P as well. In this case, apparently, the user merely makes an operation for instructing printing from the personal computer C by using the printer unit P compatible with the USB interface. In accordance with the above-described procedures, the printer unit P which has been waiting in the power saving mode, carries out printing by automatically restoring the current mode to the normal mode without waiting for the user's command any more, and its usability is very high.

Those skilled in the art can achieve the present invention by way of the above-described various embodiments. Further, a variety of modifications of these embodiments are easily conceived by those skilled in the art, and it is possible to apply to a variety of embodiments even without having inventive ability. Therefore, the present invention covers a broad range which is not contradictory to the disclosed principle and novel features, and is not limited to the above-described embodiments.

For example, in the above embodiments, although descriptions have been given by way of example of the USB interface and parallel interface, the present invention is not always limited to these interfaces. In addition, in the above embodiments, although the interface apparatus has been described by way of example of the personal computer C which is a host computer and the printer unit P, the present invention is not limited to these embodiments, but has similar operation and advantageous effect according to the similar spirit of the invention in a variety of modes.

What is claimed is:

1. An image forming system comprising:
an interface apparatus;
an image forming apparatus connected to the interface apparatus; and
a control portion, which controls operations of the interface apparatus and the image forming apparatus, the control portion performing control of:
after a speed, a class and a device ID is established between the interface apparatus and a personal computer, checking that the class is a printer;
when the personal computer determines that a print command is issued by a user operation, transmitting GET_PORT_STATUS to the interface apparatus as an operation of a printer driver according to the user's print command;
when the interface apparatus receives GET_PORT_STATUS from a USB interface as an operation of an operating program of a ROM, returning at least one of Busy, nFault and Copy Error, which are returns to GET_PORT_STATUS;
determining whether a printer is set to a power saving mode from a state of a signal line of a parallel port;
when the personal computer detects that the printer is set to the power saving mode from at least one of PError, nAck, Busy, nFault and Select which are responses to GET_PORT STATUS, requesting, from the interface apparatus, restoration to a standby state from wait information in the power saving mode by means of a SOFT_RESET command;
when the interface apparatus detects the SOFT_RESET command, generating an nInit pulse and supplying it to the printer; and
switching the printer from the power saving mode to a normal mode by the nInit pulse, and transmitting a print command and image information for printing to the printer in the personal computer as an operation of the printer driver.

* * * * *